US012143716B2

(12) United States Patent
Lin et al.

(10) Patent No.: US 12,143,716 B2
(45) Date of Patent: Nov. 12, 2024

(54) AUTOFOCUS ACCURACY AND SPEED USING THERMAL INPUT INFORMATION

(71) Applicant: Dell Products L.P., Round Rock, TX (US)

(72) Inventors: Yi Hsien Lin, Taipei (TW); Chih Hao Kao, New Taipei (TW); Chien Chih Liao, Taipei (TW)

(73) Assignee: Dell Products L.P., Round Rock, TX (US)

( * ) Notice: Subject to any disclaimer, the term of this patent is extended or adjusted under 35 U.S.C. 154(b) by 253 days.

(21) Appl. No.: 17/837,257

(22) Filed: Jun. 10, 2022

(65) Prior Publication Data
US 2023/0403464 A1 Dec. 14, 2023

(51) Int. Cl.
*H04N 23/67* (2023.01)
*H04N 23/54* (2023.01)

(52) U.S. Cl.
CPC ............ *H04N 23/67* (2023.01); *H04N 23/54* (2023.01)

(58) Field of Classification Search
CPC ...... H04N 23/54; H04N 23/67; H04N 17/002; H04N 23/52; H04N 23/55; H04N 23/00; G02B 7/09; G02B 7/285; G02B 7/028; G02B 7/08; G03B 13/36; G03B 17/55
See application file for complete search history.

(56) References Cited

U.S. PATENT DOCUMENTS

| | | | |
|---|---|---|---|
| 6,826,361 B1* | 11/2004 | Yost | H04N 23/67 396/97 |
| 9,165,668 B1* | 10/2015 | Zhao | G11C 16/349 |
| 9,383,550 B2 | 7/2016 | Osborne | |
| 9,549,107 B2 | 1/2017 | Georgiev | |
| 10,277,799 B2* | 4/2019 | Abe | H04N 23/62 |
| 10,739,551 B1* | 8/2020 | Kashyap | G02B 7/08 |
| 10,802,244 B2* | 10/2020 | Tabuchi | G02B 7/28 |
| 2017/0031128 A1* | 2/2017 | Liu | G02B 7/028 |
| 2018/0149826 A1* | 5/2018 | Lei | G02B 7/28 |
| 2018/0343444 A1* | 11/2018 | Malaescu | G03B 13/36 |

* cited by examiner

*Primary Examiner* — Antoinette T Spinks
(74) *Attorney, Agent, or Firm* — Larson Newman, LLP

(57) ABSTRACT

An imaging device includes an image sensor, a lens assembly, a temperature sensor, and a processor. The lens assembly includes a lens whose distance from the image sensor is adjustable from a minimum stroke distance to a maximum stroke distance. The temperature sensor determines a temperature of the imaging device. The processor instantiates auto focus tables that are each correlated to a temperature, receives at temperature from the temperature sensor, selects an auto focus table associated with the temperature, and provides an auto focus for the object based upon the auto focus table. Each auto focus table provides a temperature compensated correlation of a first stroke distance associated with the object at the maximum distance from the imaging device, and a second stroke distance associated with the object at the minimum distance from the imaging device.

20 Claims, 4 Drawing Sheets

| Stroke | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|
| Working Distance | Inf | 2 | 1 | .8 | .6 | | .4 | | .2 | | | | ≤ .1 | | | |
| AF Stroke Range | | | | | | | | | | | | | | | | |

Auto Focus Table (-10C)

| Stroke | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|
| Working Distance | | Inf | 2 | 1 | .8 | .6 | .4 | | .2 | | | | ≤ .1 | | | |
| AF Stroke Range | | | | | | | | | | | | | | | | |

Auto Focus Table (0C)

| Stroke | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|
| Working Distance | | | Inf | 2 | 1 | .8 | .6 | .4 | | .2 | | | | ≤ .1 | | |
| AF Stroke Range | | | | | | | | | | | | | | | | |

Auto Focus Table (15C)

| Stroke | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|
| Working Distance | | | | Inf | 2 | 1 | .8 | .6 | .4 | | .2 | | | | ≤ .1 | |
| AF Stroke Range | | | | | | | | | | | | | | | | |

Auto Focus Table (30C)

| Stroke | 0 | 10 | 20 | 30 | 40 | 50 | 60 | 70 | 80 | 90 | 100 | 110 | 120 | 130 | 140 | 150 | 160 |
|---|---|---|---|---|---|---|---|---|---|---|---|---|---|---|---|---|---|
| Working Distance | | | | | Inf | 2 | 1 | .8 | .6 | .4 | | .2 | | | | ≤ .1 | |
| AF Stroke Range | | | | | | | | | | | | | | | | | |

Auto Focus Table (45C)

| Stroke | 0 | 10 | 20 | 30 | 40 | 50 | 60 | 70 | 80 | 90 | 100 | 110 | 120 | 130 | 140 | 150 | 160 |
|---|---|---|---|---|---|---|---|---|---|---|---|---|---|---|---|---|---|
| Working Distance | | | | | | Inf | 2 | 1 | .8 | .6 | .4 | | .2 | | | | ≤ .1 |
| AF Stroke Range | | | | | | | | | | | | | | | | | |

Auto Focus Table (60C)

*FIG. 2*

AUTOFOCUS ACCURACY AND SPEED USING THERMAL INPUT INFORMATION

FIELD OF THE DISCLOSURE

This disclosure generally relates to information handling systems, and more particularly relates to improving autofocus accuracy and speed using thermal input information on an imaging device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An imaging device may include an image sensor, a lens assembly, and a temperature sensor. The lens assembly may include a lens whose distance from the image sensor is adjustable from a minimum stroke distance to a maximum stroke distance. The temperature sensor may determine a temperature of the imaging device. The device may instantiate auto focus tables that are each correlated to a temperature, receives at temperature from the temperature sensor, select an auto focus table associated with the temperature, and provide an auto focus for the object based upon the auto focus table. Each auto focus table may provide a temperature compensated correlation of a first stroke distance associated with the object at the maximum distance from the imaging device, and a second stroke distance associated with the object at the minimum distance from the imaging device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 illustrates temperature correlated auto focus tables for the imaging device of FIG. 1;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
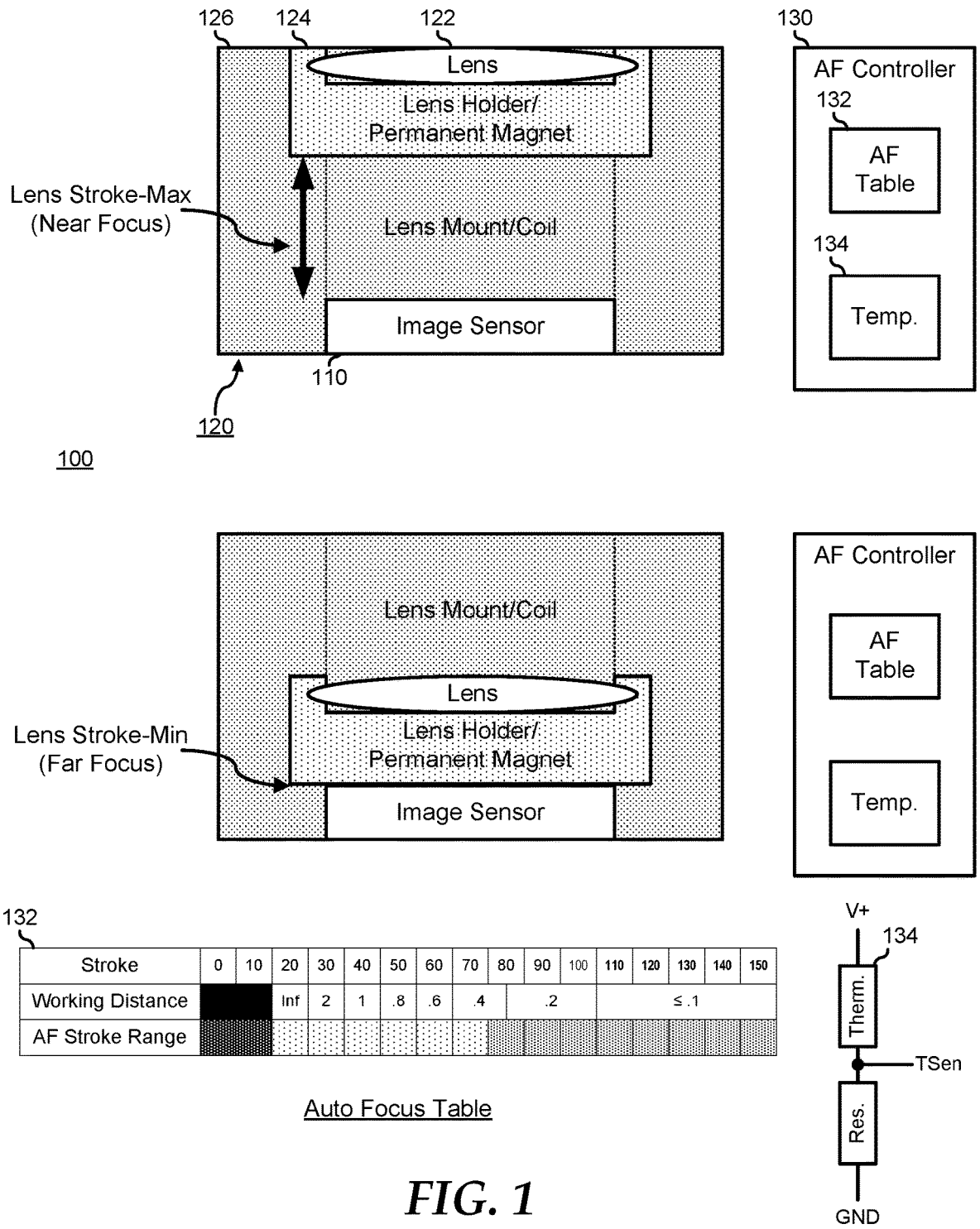
FIG. 1 is a block diagram of an imaging device according to the prior art.

FIG. 1 illustrates a Voice Coil Motor (VCM) imaging device 100 including an image sensor panel 110, a VCM lens assembly 120, and an auto focus controller 130. VCM imaging device 100 represents a compact imaging system for use in devices such as a laptop computer system, a smartphone system, a tablet device, or another type of information handling system that is configured to capture still or motion video images. Sensor panel 110 represents a device that processes light from a field of view of imaging device 100 into data indicative of an image within the filed of view, and may include a Charge-Coupled Device (CCD) panel, a CMOS sensor panel, or another type of sensor panel, as needed or desired.

VCM lens assembly 120 represents an electromechanical device that provides controlled motion of a lens 122 to focus the image projected on image sensor 110 based upon the location of an object within the field of view of VCM imaging device 100. As such, VCM lens assembly 120 includes the lens 122, a lens holder 124, and a lens mount 126. Lens holder 124 includes a mounting apparatus to retain lens 122, and operates to slide toward and away from the image capturing surface of image sensor 110 within lens mount 126. Lens mount 126 is typically affixed to image sensor 110, retains lens holder 124, and includes sliding surfaces and structures that limit the motion of the lens holder within the lens mount. Lens holder 124 is typically mounted with one or more permanent magnet, and lens mount 126 is typically mounted with one or more wire windings (coils) through which varying amounts of current are passed. The varying currents in the coils interact with the permanent magnets to produce the stroke of lens holder 124 within lens mount 126. In this way, by providing a constant current at a particular current level, lens holder 124 is moved to a particular position within the stroke to provide for a focus of VCM imaging device 110 onto a particular object within the field of view of the VCM imaging device.

In a top portion of FIG. 1, lens holder 124 is positioned at a top of the stroke (at a furthest distance from image sensor 110) to provide a focus on an object that is maximally close to VCM imaging device 100 in the field of view. For example, a maximally close object may be positioned no closer than 0.1 meter (m) in front of VCM imaging device 100, or at another distance from the front of the VCM imaging device, as needed or desired. In a bottom portion of FIG. 1, lens holder 124 is positioned at a bottom of the stroke (at a closest distance from image sensor 110) to provide a focus on an object that is maximally distant from VCM imaging device 100 in the field of view. For example, a maximally distant object may be positioned substantially infinitely far from the front of VCM imaging device 100, or at another distance from the front of the VCM imaging device, as needed or desired.

An infinite distance may be understood to not necessarily be associated with infinite distances, but may be associated with a distance beyond which a resolution of image sensor 110 is incapable of making meaningful distinctions in the image captured of the object. The bottom of the stroke may not necessarily be associated with a zero distance between image sensor 110 and lens 122, but the minimum distance between the image sensor and the lens may be fixed by the design of lens holder 124 and lens mount 126, as needed or desired. The details of camera design and lens positioning to focus an image on an image sensor are known in the art, and will not be further described herein, except as may be needed to illustrate the current embodiments.

Auto focus controller 130 represents a circuit device, processor, associated logic, hardware, software, or the like, that permit VCM imaging device 100 to automatically determine a position of lens holder 124 within lens mount 126 to most accurately focus on a particular object in the field of view of the VCM imaging device. The stroke of VCM imaging device 100 may have 160 discrete positions that may be selected to focus the VCM imaging device. Each discrete position will be understood to be obtained by precisely controlling the current through the coils of lens mounting 126 to one of 160 slightly different current levels, each current level being associated with one of the discrete positions of the stroke of VCM imaging device 100. Auto focus controller 130 includes an auto focus table 132, and a temperature sensor 134. Note that other number of discrete positions may be provided by a particular VCM imaging device, as needed or desired.

As illustrated in the bottom of FIG. 1, auto focus table 132 shows the possible stroke positions (here illustrated in blocks of ten (10) positions labeled 0-150, for simplicity of illustration). Auto focus table 132 further includes working distances of objects in the field of view in front of VCM imaging device 100 that are associated with the various possible stroke positions. The correlations between the working distances are given in relatively large blocks for simplicity of illustration. For example, the working distance block labeled "Inf" is associated with distances from infinity down to 2 m, and is associated with stroke positions 20-29. It will be understood that objects at the infinity distance will be associated with a stroke position of 20, that objects at the 2 m distance will be associated with a stroke position of 29, and that objects at distances between the infinity distance and 2 m will be ascribed to stroke positions 21-28 based upon some predetermined relationship (such s a linear interpolation, a logarithmic or invers-logarithmic interpolation, or the like.

Similar considerations will be understood for the other working distance blocks and associated stroke positions. As the distance of an object gets smaller, a larger number of stroke positions are associated with the distances. This may be understood in that the pixel resolution of image sensor 110 may more finely elicit details from closer objects than from further objects, necessitating finer grained adjustments to the stroke position to accurately focus on the closer objects. Beyond the infinity distance, the shorter stroke positions are understood to yield no greater detail in the resulting image, so the stroke positions associated with working distances beyond the infinity distance may be ignored for the purposes of the auto focus mechanism as described further below. The stroke positions illustrated herein are exemplary, and may be determined as distances, such as where VCM imaging device 100 has a stroke range of 0-150 micrometers (μm). Here further, note that the sized of the steps are illustrative, and a particular VCM imaging device may exhibit stroke positions with a granularity of 10 μm, 5 μm, 2 μm, 1 μm or another distance, as needed or desired.

When a user of VCM imaging device 100 wishes to capture an image or video of an object, an auto focus algorithm embodied by auto focus controller 130 operates to set the stroke positions of lens holder 124, and to capture a test image at that particular stroke position. The captured image is evaluated for sharpness of the image, and a determination is made to either retain the stroke position, or to modify the stroke position and capture and reevaluate an image at the modified stroke position. The details of auto focus cameras are known in the art, and particularly the algorithms for finding an optimized stroke position are also known in the art, and will not be further described herein, except as may be needed to illustrate the current embodiments.

In a particular embodiment, auto focus controller 130 operates to determine a stroke position for objects at all distances in the field of view in front of VCM imaging device 100, from the infinity distance down to the closest distance (for example 0.1 m). However, in this embodiment, it will be understood that the length of time needed to consider all of the stroke positions may be long. In particular, where an object of interest is close to VCM imaging device 100, but other objects are also within the field of view, but are farther from the VCM imaging device, the auto focus feature may have to choose between the stroke position associated with the farther objects and the stroke position associated with the closer object. As such, an auto focus algorithm according to the current embodiment may take on the order of three (3) to ten (10) seconds to resolve the focus when objects close to VCM imaging device 100 are permitted into the range of objects.

In another embodiment, the range of objects in the field of view in front of VCM imaging device 100 that are considered by the auto focus algorithm is limited. In particular, it may be desirable for a user to have a quicker auto focus feature when the user is not intending to capture images of objects close to VCM imaging device 100. Here, the range of the stroke positions utilized in the auto focus algorithm may be limited, for example to objects no closer than 0.5 m in front of VCM imaging device 100. As illustrated in auto focus table 132, here, the range of stroke positions utilized by auto focus controller 130 in its auto focus algorithm is limited to 20-79, corresponding to objects that are between the infinity distance and around 0.3 m. It will be understood that other ranges of stroke positions may be utilized, as needed or desired, and that further limiting of the range of stroke positions utilized in the auto focus algorithm will further decrease the time duration needed to complete the auto focus function. For example, a user may select to have the auto focus range limited to between 2 m and 0.5 m, such as when "selfie" images are taken.

Temperature sensor 134 represents a device that provides a temperature read out for the temperature of VCM imaging device 100. An exemplary temperature sensor 134 is illustrated in the bottom-right portion of FIG. 1, where the temperature sensor includes a thermistor and a resistor connected in series between a positive voltage and a ground. A temperature sense output is provided as the voltage at a voltage divider between the thermistor and the resistor. It will be understood that the thermistor exhibits varying resistance as the temperature changes. As such, auto focus controller 130 may operate to correlate a voltage at the temperature sense output with the temperature of VCM imaging device 100, for example by implementing a look-up table that provides a correlated temperature for each voltage level exhibited on the temperature sense output.

It has been understood by the inventors of the current disclosure that lens 122 typically exhibits varying optical characteristics based upon the temperature of the lens. For example, when VCM imaging device 100 is cold, such as when the VCM imaging device is outdoors in a freezing environment, the optical characteristics of lens 122 may be such that, in order to accurately focus on objects at the infinity distance, the shorter stroke positions may be needed, essentially shifting the working distance entries of auto focus table 132 to the left. On the other hand, when VCM imaging device 100 is hot, such as when the VCM imaging device has been operating continuously, the optical characteristics of lens 122 may be such that, in order to accurately focus on objects at the infinity distance, more of the shorter stroke positions may not be needed, essentially shifting the working distance entries of auto focus table 132 to the right.

FIG. 2 illustrates six (6) auto focus tables similar to auto focus table 132. Here, each auto focus table is correlated with a particular temperature within an expected operating range of VCM imaging device 100. For example, a first auto focus table provides working distance/stroke position correlations, and an associated auto focus stroke range for −10 degrees Celsius (C). A next auto focus table provides working distance/stroke position correlations, and an associated auto focus stroke range for zero (0 C). A next auto focus table provides working distance/stroke position correlations, and an associated auto focus stroke range for 15 C. A next auto focus table provides working distance/stroke position correlations, and an associated auto focus stroke range for 30 C. A next auto focus table provides working distance/stroke position correlations, and an associated auto focus stroke range for 45 C. A final auto focus table provides working distance/stroke position correlations, and an associated auto focus stroke range for 60 C. In a particular embodiment, the auto focus tables, and particularly the temperature compensated working distances, are provided by a manufacturer of VCM imaging system 100.

In a particular embodiment, auto focus controller 130 instantiates auto focus table 132 as a series of temperature correlated auto focus tables as illustrated in FIG. 2. When the auto focus feature of VCM imaging device 100 is engaged, auto focus controller 130 operates to determine the temperature of the VCM imaging device from temperature sensor 134, and then the auto focus controller utilizes the temperature compensated auto focus table associated with the detected temperature in performing the auto focus function.

Figure 3:
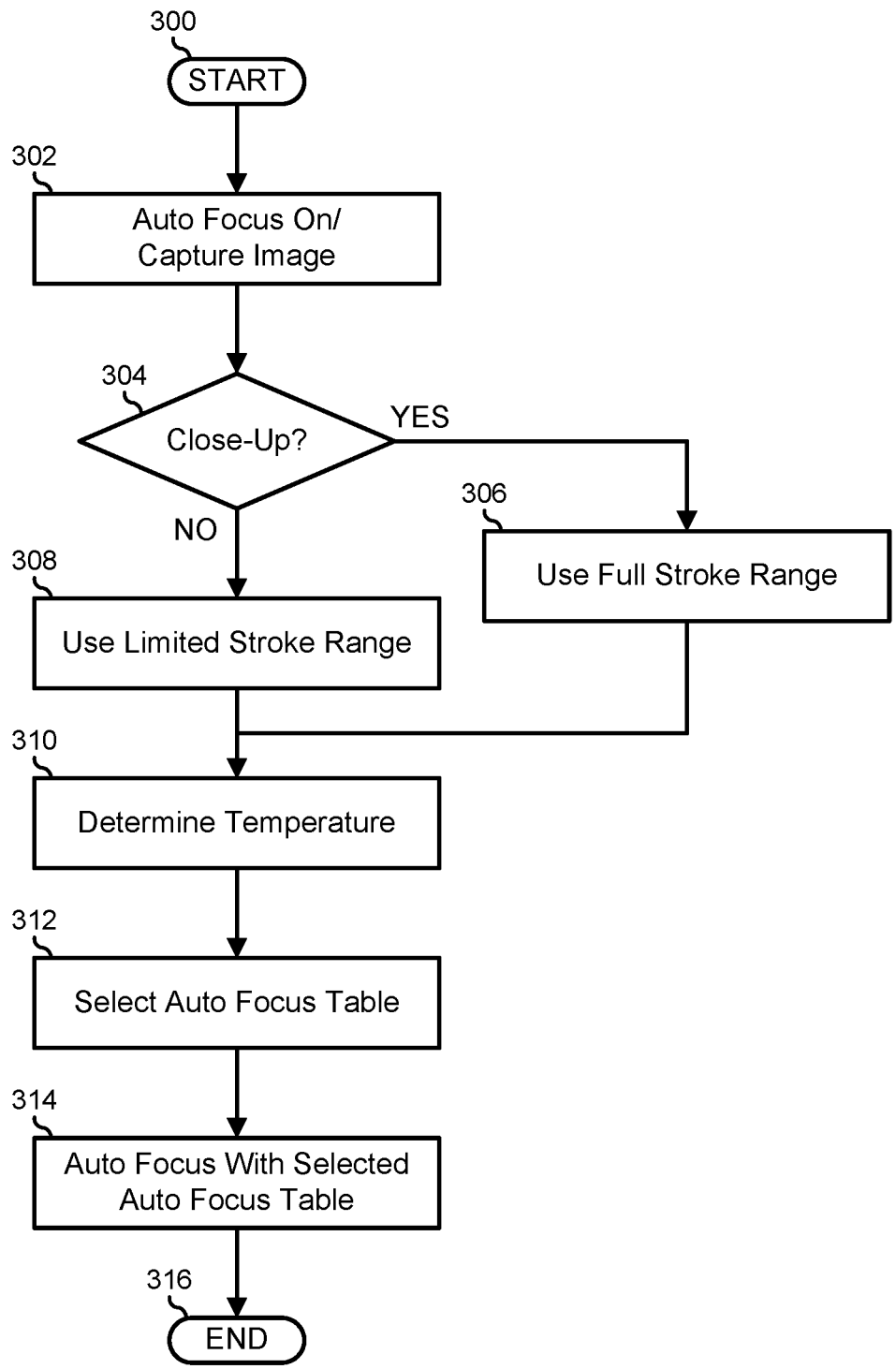
FIG. 3 is a flowchart illustrating a method for improving autofocus accuracy and speed using thermal input information on an imaging device according to another embodiment of the current disclosure.

FIG. 3 illustrates a method for improving autofocus accuracy and speed using thermal input information on an imaging device, starting at block 302. An auto focus function of an imaging device is turned on and a user selects an image to capture in block 302. A decision is made as to whether or not a closeup mode is selected in decision block 304. If so, the "YES" branch of decision block 304 is taken, a full stroke range associated with object ranges from an infinity distance to a closest object distance is selected in block 306, and the method proceeds to block 310, as described below.

If the closeup mode is not selected, the "NO" branch of decision block 304 is taken and a limited stroke range associated with object ranges from the infinity distance to an intermediate object distance is selected in block 308, and the method proceeds to block 310. At block 310, a temperature of the imaging device is determined. An auto focus table corresponding to the determined temperature is selected in block 312. An auto focus algorithm on the selected image to be captured is performed based upon the selected auto focus table and the image is captured with the determined focus stroke in block 314, and the method ends in block 316.

Figure 4:
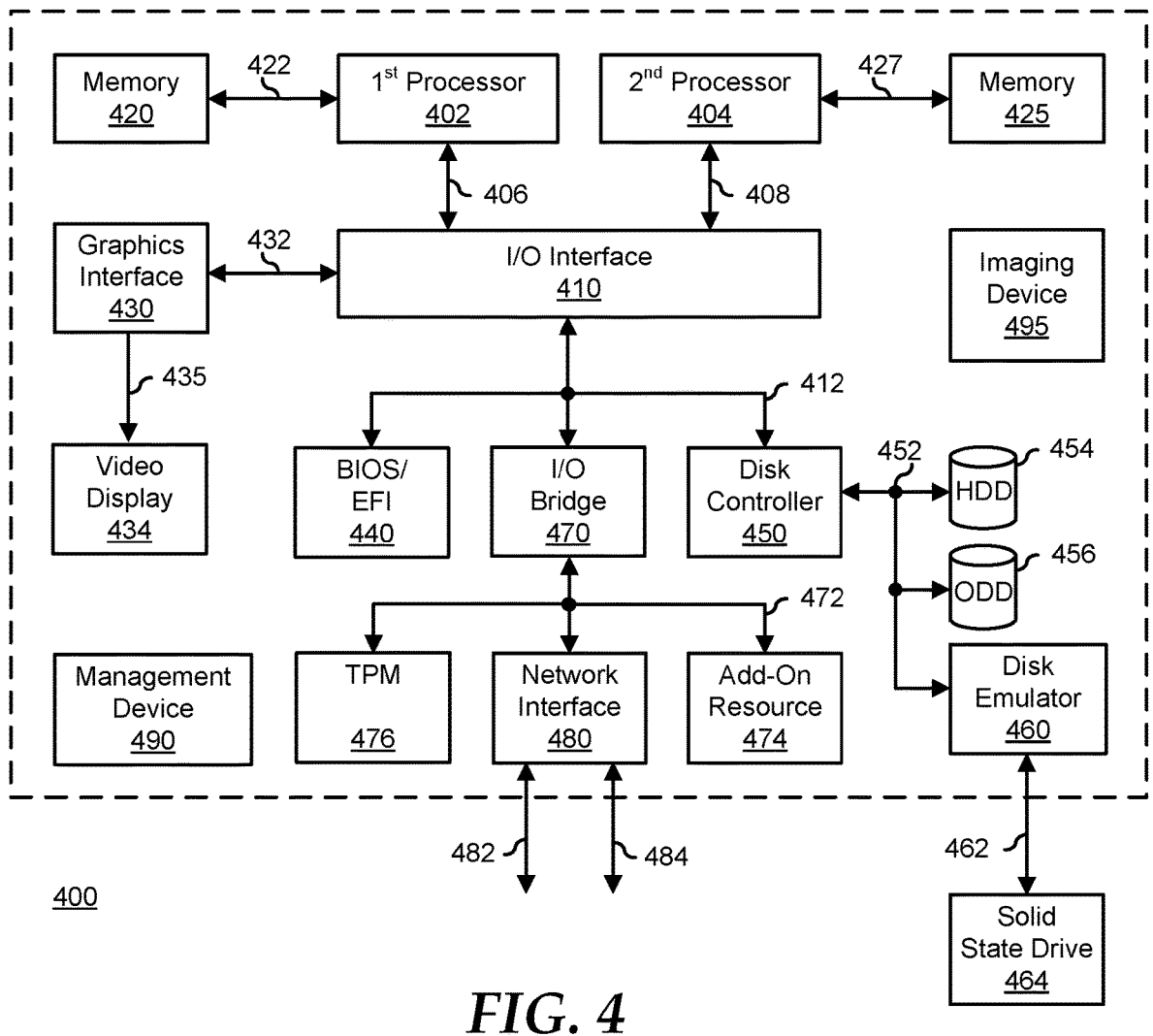
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and an imaging device 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An imaging device, comprising:
    an image sensor;
    a lens assembly including a lens whose distance from the image sensor is adjustable from a minimum stroke distance to a maximum stroke distance, the minimum stroke distance being to focus an object at a maximum distance from the imaging device on the image sensor, and the maximum stroke distance being to focus the object at a minimum distance from the imaging device on the image sensor;
    a temperature sensor configured to determine a temperature of the imaging device; and
    a processor configured to instantiate a plurality of auto focus tables, each auto focus table being correlated to a particular temperature in an operating temperature range of the imaging device, to receive a first temperature from the temperature sensor, to select a first auto focus table associated with the first temperature, and to provide a first auto focus for the object based upon the first auto focus table, wherein each auto focus table provides a temperature compensated correlation of a first stroke distance associated with the object at the maximum distance from the imaging device, and a second stroke distance associated with the object at the minimum distance from the imaging device.

2. The imaging device of claim 1, wherein the processor is further configured to receive a second temperature from the temperature sensor, to select a second auto focus table associated with the second temperature, and to provide a second auto focus for the object based upon the second auto focus table.

3. The imaging device of claim 1, wherein, for a particular auto focus table associated with a lowest temperature in the operating temperature range of the imaging device, the first stroke distance is the minimum stroke distance.

4. The imaging device of claim 1, wherein, for a particular auto focus table associated with a temperature greater than a lowest temperature in the operating range of the imaging device, the first stroke distance is greater than the minimum stroke distance.

5. The imaging device of claim 1, wherein in a first mode, the first auto focus is provided over a first stroke range from the first stroke distance to the second stroke distance.

6. The imaging device of claim 5, wherein in a second mode, the first auto focus is provided over a second stroke range from the first stroke distance to a third stroke distance, the third stroke distance being less than the second stroke distance.

7. The imaging device of claim 1, wherein the temperature sensor includes a thermistor coupled in series with a resistor between a voltage.

8. The imaging device of claim 7, wherein a voltage divider voltage between the thermistor and the resistor is correlated with the temperature.

9. The imaging device of claim 1, wherein the lens assembly is a Voice Coil Motor (VCM) lens assembly.

10. A method, comprising:
    providing, in an imaging device, an image sensor;
    providing a lens assembly including a lens whose distance from the image sensor is adjustable from a minimum stroke distance to a maximum stroke distance, the minimum stroke distance being to focus an object at a maximum distance from the imaging device on the image sensor, and the maximum stroke distance being to focus the object at a minimum distance from the imaging device on the image sensor;
    instantiating on the imaging device a plurality of auto focus tables, each auto focus table being correlated to a particular temperature in an operating temperature range of the imaging device, wherein each auto focus table provides a temperature compensated correlation of a first stroke distance associated with the object at the maximum distance from the imaging device, and a second stroke distance associated with the object at the minimum distance from the imaging device;
    selecting a first auto focus table associated with a first temperature of the imaging device; and
    providing a first auto focus for the object based upon the first auto focus table.

11. The method of claim 10, further comprising:
    selecting a second auto focus table associated with a second temperature of the imaging device; and
    providing a second auto focus for the object based upon the second auto focus table.

12. The method of claim 10, wherein, for a particular auto focus table associated with a lowest temperature in the operating temperature range of the imaging device, the first stroke distance is the minimum stroke distance.

13. The method of claim 10, wherein, for a particular auto focus table associated with a temperature greater than a lowest temperature in the operating range of the imaging device, the first stroke distance is greater than the minimum stroke distance.

14. The method of claim 10, wherein in a first mode, the first auto focus is provided over a first stroke range from the first stroke distance to the second stroke distance.

15. The method of claim 14, wherein in a second mode, the first auto focus is provided over a second stroke range from the first stroke distance to a third stroke distance, the third stroke distance being less than the second stroke distance.

16. The method of claim 10, wherein the imaging device includes a thermistor coupled in series with a resistor between a voltage.

17. The method of claim 16, wherein a voltage divider voltage between the thermistor and the resistor is correlated with the temperature.

18. The method of claim 10, wherein the lens assembly is a Voice Coil Motor (VCM) lens assembly.

19. An information handling system, comprising:
    a processor;
    an imaging device including an image sensor, a lens assembly, and a temperature sensor; and a memory to store a plurality of auto focus tables, each auto focus table being correlated to a particular temperature in an operating temperature range of the imaging device;

wherein:
- the lens assembly includes a lens whose distance from the image sensor is adjustable from a minimum stroke distance to a maximum stroke distance, the minimum stroke distance being to focus an object at a maximum distance from the imaging device on the image sensor, and the maximum stroke distance being to focus the object at a minimum distance from the imaging device on the image sensor; and
- the processor 1) instantiates a plurality of auto focus tables, each auto focus table being correlated to a corresponding different particular temperature in an operating temperature range of the imaging device, 2) receives a first temperature from the temperature sensor, 3) selects a first auto focus table associated with the first temperature, and provides a first auto focus for the object based upon the first auto focus table, wherein each auto focus table provides a temperature compensated correlation of a first stroke distance associated with the object at the maximum distance from the imaging device, and a second stroke distance associated with the object at the minimum distance from the imaging device.

20. The information handling system of claim 19, wherein the processor is further configured to receive a second temperature from the temperature sensor, to select a second auto focus table associated with the second temperature, and to provide a second auto focus for the object based upon the second auto focus table.

* * * * *